(12) United States Patent
Vijayan et al.

(10) Patent No.: US 8,572,340 B2
(45) Date of Patent: Oct. 29, 2013

(54) SYSTEMS AND METHODS FOR RETAINING AND USING DATA BLOCK SIGNATURES IN DATA PROTECTION OPERATIONS

(75) Inventors: Manoj Kumar Vijayan, Marlboro, NJ (US); Deepak Raghunath Attarde, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 379 days.

(21) Appl. No.: 12/982,087

(22) Filed: Dec. 30, 2010

(65) Prior Publication Data

US 2012/0084518 A1    Apr. 5, 2012

Related U.S. Application Data

(60) Provisional application No. 61/388,506, filed on Sep. 30, 2010.

(51) Int. Cl.
*G06F 12/16* (2006.01)

(52) U.S. Cl.
USPC .... 711/162; 711/112; 711/117; 711/E12.103; 707/640; 707/692; 707/693

(58) Field of Classification Search
None
See application file for complete search history.

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |

(Continued)

FOREIGN PATENT DOCUMENTS

| | | |
|---|---|---|
| EP | 0259912 | 3/1988 |
| EP | 0405926 | 1/1991 |

(Continued)

OTHER PUBLICATIONS

CommVault Systems, Inc., "Deduplication—How to," http://documentation.commvault.com/commvault/release_8_0_0/books_online_1/english_US/features/single_instance/single_instance_how_to.htm, internet accessed on May 21, 2009, 7 pages.

(Continued)

*Primary Examiner* — Michael Krofcheck
(74) *Attorney, Agent, or Firm* — Knobbe Martens Olson & & Bear LLP

(57) ABSTRACT

A system according to certain embodiments associates a signature value corresponding to a data block with one or more data blocks and a reference to the data block to form a signature/data word corresponding to the data block. The system further logically organizes the signature/data words into a plurality of files each comprising at least one signature/data word such that the signature values are embedded in the respective file. The system according to certain embodiments reads a previously stored signature value corresponding to a respective data block for sending from a backup storage system having at least one memory device to a secondary storage system. Based on an indication as to whether the data block is already stored on the secondary storage system, the system reads the data block from the at least one memory device for sending to the secondary storage system if the data block exists on the secondary storage system, wherein the signature value and not the data block is read from the at least one memory device if the data block exists on the secondary storage system.

12 Claims, 7 Drawing Sheets

(56) References Cited

U.S. PATENT DOCUMENTS

| | | |
|---|---|---|
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,625,793 A | 4/1997 | Mirza |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,732,240 A | 3/1998 | Caccavale |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,940,833 A | 8/1999 | Benson |
| 5,950,205 A | 9/1999 | Aviani, Jr. |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,425,057 B1 | 7/2002 | Cherkasova et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,658,526 B2 | 12/2003 | Nguyen et al. |
| 6,704,730 B2 | 3/2004 | Moulton et al. |
| 6,757,794 B2 | 6/2004 | Cabrera et al. |
| 6,810,398 B2 | 10/2004 | Moulton |
| 6,865,655 B1 | 3/2005 | Andersen |
| 6,952,758 B2 | 10/2005 | Chron et al. |
| 7,028,096 B1 | 4/2006 | Lee |
| 7,085,904 B2 | 8/2006 | Mizuno et al. |
| 7,117,246 B2 | 10/2006 | Christenson et al. |
| 7,143,091 B2 | 11/2006 | Charnock |
| 7,246,272 B2 | 7/2007 | Cabezas et al. |
| 7,272,606 B2 | 9/2007 | Borthakur et al. |
| 7,287,252 B2 | 10/2007 | Bussiere et al. |
| 7,383,462 B2 | 6/2008 | Osaki et al. |
| 7,437,388 B1 | 10/2008 | DeVos |
| 7,490,207 B2 | 2/2009 | Amarendran |
| 7,516,186 B1 | 4/2009 | Borghetti et al. |
| 7,519,726 B2 | 4/2009 | Palliyil et al. |
| 7,539,710 B1 | 5/2009 | Haustein et al. |
| 7,568,080 B2 | 7/2009 | Prahlad et al. |
| 7,584,338 B1 | 9/2009 | Bricker et al. |
| 7,613,748 B2 | 11/2009 | Brockway et al. |
| 7,631,194 B2 | 12/2009 | Wahlert et al. |
| 7,657,550 B2 | 2/2010 | Prahlad et al. |
| 7,685,126 B2 | 3/2010 | Patel et al. |
| 7,720,841 B2 | 5/2010 | Gu et al. |
| 7,734,820 B1 | 6/2010 | Ranade et al. |
| 7,747,579 B2 | 6/2010 | Prahlad et al. |
| 7,761,425 B1 | 7/2010 | Erickson et al. |
| 7,797,279 B1 * | 9/2010 | Starling et al. ............ 707/641 |
| 7,814,149 B1 | 10/2010 | Stringham |
| 7,822,939 B1 | 10/2010 | Veprinsky et al. |
| 7,827,150 B1 | 11/2010 | Wu et al. |
| 7,831,795 B2 | 11/2010 | Prahlad et al. |
| 8,074,043 B1 | 12/2011 | Zeis |
| 8,200,923 B1 * | 6/2012 | Healey et al. ............ 711/162 |
| 8,280,854 B1 | 10/2012 | Emmert |
| 8,364,652 B2 | 1/2013 | Vijayan et al. |
| 8,484,162 B2 | 7/2013 | Prahlad et al. |
| 2002/0107877 A1 | 8/2002 | Whiting et al. |
| 2002/0169934 A1 | 11/2002 | Krapp et al. |
| 2003/0033308 A1 | 2/2003 | Patel et al. |
| 2004/0148306 A1 | 7/2004 | Moulton et al. |
| 2005/0033756 A1 | 2/2005 | Kottomtharayil et al. |
| 2005/0204108 A1 | 9/2005 | Ofek et al. |
| 2005/0243609 A1 | 11/2005 | Yang et al. |
| 2005/0273654 A1 | 12/2005 | Chen et al. |
| 2006/0010227 A1 | 1/2006 | Atluri |
| 2006/0064456 A1 | 3/2006 | Kalthoff et al. |
| 2006/0095527 A1 | 5/2006 | Malik |
| 2006/0101096 A1 | 5/2006 | Fuerst |
| 2006/0179405 A1 | 8/2006 | Chao et al. |
| 2006/0224846 A1 | 10/2006 | Amarendran et al. |
| 2007/0156966 A1 | 7/2007 | Sundarrajan et al. |
| 2007/0162462 A1 | 7/2007 | Zhang et al. |
| 2007/0179995 A1 | 8/2007 | Prahlad et al. |
| 2007/0192542 A1 | 8/2007 | Frolund et al. |
| 2007/0192544 A1 | 8/2007 | Frolund et al. |
| 2007/0203937 A1 | 8/2007 | Prahlad et al. |
| 2007/0250670 A1 | 10/2007 | Fineberg et al. |
| 2007/0255758 A1 | 11/2007 | Zheng et al. |
| 2008/0005509 A1 | 1/2008 | Smith et al. |
| 2008/0016131 A1 | 1/2008 | Sandorfi et al. |
| 2008/0091655 A1 | 4/2008 | Gokhale et al. |
| 2008/0133561 A1 | 6/2008 | Dubnicki et al. |
| 2008/0159331 A1 | 7/2008 | Mace et al. |
| 2008/0229037 A1 | 9/2008 | Bunte et al. |
| 2008/0243879 A1 | 10/2008 | Gokhale et al. |
| 2008/0243914 A1 | 10/2008 | Prahlad et al. |
| 2008/0243953 A1 | 10/2008 | Wu et al. |
| 2008/0243957 A1 | 10/2008 | Prahlad et al. |
| 2008/0243958 A1 | 10/2008 | Prahlad et al. |
| 2008/0244172 A1 | 10/2008 | Kano |
| 2008/0244199 A1 | 10/2008 | Nakamura et al. |
| 2008/0244204 A1 | 10/2008 | Cremelie et al. |
| 2008/0250204 A1 | 10/2008 | Kavuri et al. |
| 2009/0013129 A1 | 1/2009 | Bondurant |
| 2009/0043767 A1 | 2/2009 | Joshi et al. |
| 2009/0055425 A1 | 2/2009 | Evans et al. |
| 2009/0138481 A1 | 5/2009 | Chatley et al. |
| 2009/0144416 A1 | 6/2009 | Chatley et al. |

(56) References Cited

U.S. PATENT DOCUMENTS

| | | |
|---|---|---|
| 2009/0144422 A1 | 6/2009 | Chatley et al. |
| 2009/0172139 A1 | 7/2009 | Wong et al. |
| 2009/0204636 A1 | 8/2009 | Li et al. |
| 2009/0204649 A1 | 8/2009 | Wong et al. |
| 2009/0210431 A1 | 8/2009 | Marinkovic et al. |
| 2009/0254507 A1* | 10/2009 | Hosoya et al. .................. 706/48 |
| 2009/0271454 A1 | 10/2009 | Anglin et al. |
| 2009/0276454 A1 | 11/2009 | Smith |
| 2009/0307251 A1 | 12/2009 | Heller et al. |
| 2009/0319534 A1 | 12/2009 | Gokhale |
| 2009/0319585 A1 | 12/2009 | Gokhale |
| 2010/0005259 A1 | 1/2010 | Prahlad |
| 2010/0036887 A1 | 2/2010 | Anglin et al. |
| 2010/0070478 A1 | 3/2010 | Anglin |
| 2010/0077161 A1 | 3/2010 | Stoakes et al. |
| 2010/0082672 A1 | 4/2010 | Kottomtharayil et al. |
| 2010/0114833 A1* | 5/2010 | Mu ............................... 711/162 |
| 2010/0169287 A1 | 7/2010 | Klose |
| 2010/0180075 A1 | 7/2010 | McCloskey et al. |
| 2010/0250896 A1 | 9/2010 | Matze |
| 2010/0299490 A1 | 11/2010 | Attarde et al. |
| 2011/0113016 A1 | 5/2011 | Gruhl et al. |
| 2011/0161723 A1 | 6/2011 | Taleck et al. |
| 2011/0276543 A1 | 11/2011 | Matze |
| 2011/0289281 A1 | 11/2011 | Spackman |
| 2012/0011101 A1* | 1/2012 | Fang et al. .................... 707/654 |
| 2012/0084268 A1 | 4/2012 | Vijayan et al. |
| 2012/0084269 A1 | 4/2012 | Vijayan et al. |
| 2012/0084518 A1 | 4/2012 | Vijayan et al. |
| 2012/0084519 A1 | 4/2012 | Vijayan et al. |
| 2012/0150814 A1 | 6/2012 | Retnamma et al. |
| 2012/0150817 A1 | 6/2012 | Retnamma et al. |
| 2012/0150818 A1 | 6/2012 | Retnamma et al. |
| 2012/0150826 A1 | 6/2012 | Retnamma et al. |
| 2012/0150949 A1 | 6/2012 | Retnamma et al. |

FOREIGN PATENT DOCUMENTS

| | | |
|---|---|---|
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2010/013292 A1 | 2/2010 |
| WO | WO 2012/044366 | 4/2012 |
| WO | WO 2012/044367 | 4/2012 |

OTHER PUBLICATIONS

CommVault Systems, Inc., "Deduplication," http://documentation.commvault.com/commvault/release_8_0_0/books_online_1/english_US/features/single_instance/single_instance.htm, internet accessed on May 21, 2009, 9 pages.

First Office Action in U.S. Appl. No. 12/982,071 date Jun. 21, 2012.

International Search Report and Written Opinion, International Application No. PCT/US2009/58137, Mail Date Dec. 23, 2009, 9 pages.

Office Action in U.S. Appl. No. 12/982,086 dated Apr. 19, 2012.

U.S. Appl. No. 12/565,576, filed Sep. 23, 2009, Kottomtharayil et al.

U.S. Appl. No. 12/626,839, filed Nov. 27, 2009, Klose.

Armstead et al., "Implementation of a Campus-Wide Distributed Mass Storage Service: The Dream vs. Reality," IEEE, 1995, pp. 190-199.

Arneson, "Mass Storage Archiving in Network Environments" IEEE, 1998, pp. 45-50.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5-9, 1995, pp. 420-427, San Francisco, CA.

CommVault Systems, Inc. "Continuous Data Replicator 7.0," Product Data Sheet, 2007.

CommVault Systems, Inc., "Deduplication—How To," http://documentation.commvault.com/commvault/release_8_0_0/books_online_1/english_US/features/single_instance/single_instance_how_to.htm, internet accessed on Jan. 26, 2009, 7 pages.

CommVault Systems, Inc., "Deduplication," http://documentation.commvault.com/commvault/release_8_0_0/books_online_1/english_US/features/single_instance/single_instance.htm, internet accessed on Jan. 26, 2009, 9 pages.

Diligent Technologies HyperFactor, http://www.dilligent.com/products:protecTIER-1:HyperFactor-1, Internet accessed on Dec. 5, 2008, 2 pages.

Eitel, "Backup and Storage Management in Distributed Heterogeneous Environments," IEEE, 1994, pp. 124-126.

GAIT, "The Optical File Cabinet: A Random-Access File system for Write-Once Optical Disks," IEEE Computer, vol. 21, No. 6, pp. 11-22 (1988).

International Search Report and Written Opinion, International Application No. PCT/US2009/58137, Mail Date Dec. 23, 2009, 14 pages.

Jander, "Launching Storage-Area Net," Data Communications, US, McGraw Hill, NY, vol. 27, No. 4(Mar. 21, 1998), pp. 64-72.

Kornblum, Jesse, "Identifying Almost Identical Files Using Context Triggered Piecewise Hashing," www.sciencedirect.com, Digital Investigation 3S (2006), pp. S91-S97.

Lortu Software Development, "Kondar Technology-Deduplication," http://www.lortu.com/en/deduplication.asp, Internet accessed on Dec. 5, 2008, 3 pages.

Overland Storage, "Data Deduplication," http://www.overlandstorage.com/topics/data_deduplication.html, Internet accessed on Dec. 5, 2008, 2 pages.

Quantum Corporation, "Data De-Duplication Background: A Technical White Paper," May 2008, 13 pages.

Rosenblum et al., "The Design and Implementation of a Log-Structure File System," Operating Systems Review SIGOPS, vol. 25, No. 5, New York, US, pp. 1-15 (May 1991).

International Search Report and Written Opinion, International Application No. PCT/US2011/30814, Cite Date May 23, 2011.

International Search Report and Written Opinion, International Application No. PCT/US2011/30804, Cite Date May 24, 2011.

International Search Report and Written Opinion, International Application No. PCT/US2009/58137, Mail Date Dec. 23, 2009.

* cited by examiner

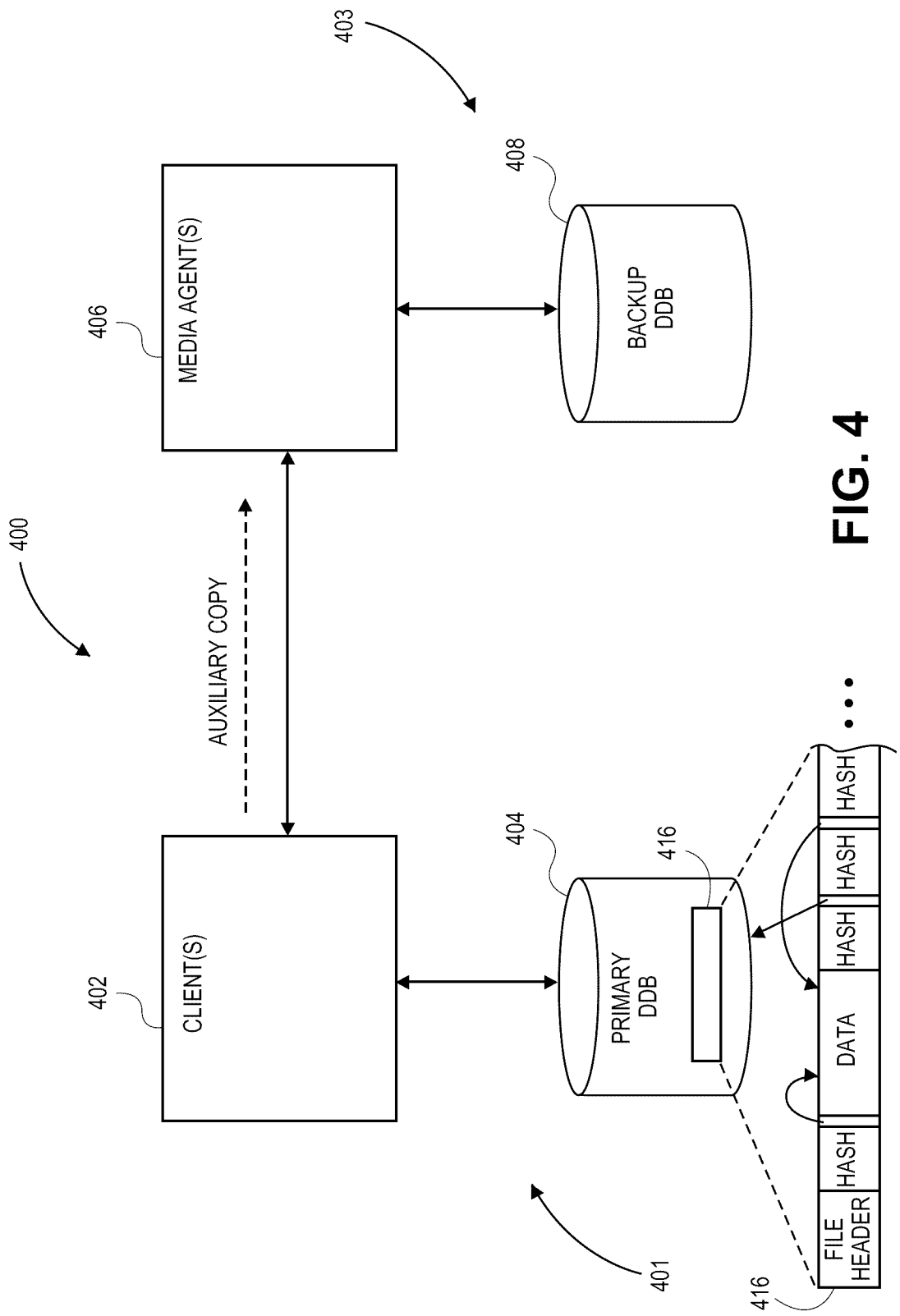

SYSTEMS AND METHODS FOR RETAINING AND USING DATA BLOCK SIGNATURES IN DATA PROTECTION OPERATIONS

CROSS-REFERENCE TO RELATED APPLICATION

This application claims the benefit of priority under 35 U.S.C. §119(e) of U.S. Provisional Patent Application No. 61/388,506, filed on Sep. 30, 2010, and entitled "SYSTEMS AND METHODS FOR RETAINING AND USING DATA BLOCK SIGNATURES IN DATA PROTECTION OPERATIONS," the disclosure of which is hereby incorporated by reference in its entirety.

BACKGROUND

Computers have become an integral part of business operations such that many banks, insurance companies, brokerage firms, financial service providers, and a variety of other businesses rely on computer networks to store, manipulate, and display information that is constantly subject to change. Oftentimes, the success or failure of an important transaction may turn on the availability of information that is both accurate and current. Accordingly, businesses worldwide recognize the commercial value of their data and seek reliable, cost-effective ways to protect the information stored on their computer networks.

In corporate environments, protecting information is generally part of a routine process that is performed for many computer systems within an organization. For example, a company might back up critical computing systems related to e-commerce such as databases, file servers, web servers, and so on as part of a daily, weekly, or monthly maintenance schedule. The company may also protect computing systems used by each of its employees, such as those used by an accounting department, marketing department, engineering department, and so forth.

As such, enterprises are generating ever increasing volumes of data and corresponding storage requirements. Moreover, enterprise storage systems are typically distributed over one or more networks, such as where backup storage is remote from client computers. In such situations, storage system activity can place heavy demands on available network bandwidth.

SUMMARY

In response to these challenges, one technique developed by storage system providers is data deduplication. Deduplication typically involves eliminating or reducing the amount of redundant data stored and communicated within a storage system, improving storage utilization. For example, data can be divided into units of a chosen granularity (e.g., files or data blocks). As new data enters the system, the data units can be checked to see if they already exist in the storage system. If the data unit already exists, instead of storing and/or communicating a duplicate copy, the storage system stores and/or communicates a reference to the existing data segment. Thus, deduplication can improve storage utilization, system traffic (e.g., over a networked storage system), or both.

However, deduplcation techniques can be highly computationally intensive. For example, in order to determine whether a block already exists in storage, deduplication often involves computing a substantially unique signature or identifier (e.g., a hash) of data segments and comparing signature to signatures of existing data segments. In order to generate the signature, the storage system typically reads the data from memory and then computes the signature. Given the volume of data storage systems are typically dealing with, such overhead can reduce performance significantly.

In view of the foregoing, a need exists for a storage system which reduces deduplication overhead, particularly during large backup operations.

In certain embodiments, a method is disclosed for performing an auxiliary copy operation from a backup storage system to a secondary storage system. The method includes in response to instructions to copy at least some of a plurality of backed up data blocks from a backup storage system comprising at least one memory device to a secondary storage system the following, for each of the at least some data blocks: reading, with one or more processors, a previously stored signature value corresponding to the respective data block for sending from the backup storage system to the secondary storage system, and based on an indication as to whether the data block is already stored on the secondary storage system, reading the data block from the at least one memory device for sending to the secondary storage system if the data block does not exist on the secondary storage system, wherein the signature value and not the data block is read from the at least one memory device if the data block exists on the secondary storage system.

In certain embodiments, a system is disclosed for performing an auxiliary copy operation from a backup storage system to a secondary storage system. The system includes a backup storage system comprising at least one memory device. The system further includes a copy management module executing in one or more processors and configured to, in response to instructions to copy at least some of a plurality of backed up data blocks stored in the at least one memory device to a secondary storage system, for each of the at least some data blocks: read a previously stored signature value corresponding to the respective data block for sending from the backup storage system to the secondary storage system; and on an indication as to whether the data block is already stored on the secondary storage system, to read the data block from the at least one memory device for sending to the secondary storage system if the data block does not exist on the secondary storage system, wherein the signature value and not the data block is read from the at least one memory device if the data block exists on the secondary storage system.

In certain embodiments, a method is disclosed for communicating data from a first storage system to a second storage system. The method includes in response to instructions to send at least some of a plurality of data blocks from a first storage system to a second storage system, for each of the at least some data blocks: reading, with one or more processors, a previously stored signature value corresponding to the respective data block for sending from the first storage system to the second storage system, and based on an indication as to whether the data block is already stored on the second storage system, reading the data block for sending to the second storage system if the data block does not exist on the second storage system, wherein the signature value and not the data block is read if the data block exists on the second storage system.

In certain embodiments, a method is disclosed for performing an auxiliary copy operation from a backup storage system to a secondary storage system comprising deduplicated data. The method includes for each of a plurality of data blocks involved in a backup storage operation, storing with one or more processors a signature value corresponding to the data block and one or more of the data block and a reference to the data block on at least one memory device of a backup storage system. The method further includes in response to instructions to perform an auxiliary copy of at least a subset of the plurality of data blocks to a secondary storage system comprising deduplicated data, for each data block in the subset of data blocks: reading the previously stored signature value corresponding to the respective data block from the at least one storage device for sending to the secondary storage system, and based on an indication as to whether the data block is already stored on the secondary storage system, reading the data block from the at least one storage device for sending to the secondary backup storage system if the data block is not already stored on the secondary backup storage system, wherein the signature value and not the data block is read from the at least one storage device if the data block is already stored on the secondary backup storage system.

In certain embodiments, a system is disclosed for performing an auxiliary copy operation from a backup storage system to a secondary backup storage system. The system includes a backup storage system comprising at least one memory device and in networked communication with a secondary backup storage system. The system further includes a data packaging module executing in one or more processors and configured to, for each of a plurality of data blocks involved in a backup storage operation, store a signature value corresponding to the data block and store one or more of the data block and a reference to the data block on the at least one memory device. The system further includes a copy management module executing in one or more processors and configured to, for each data block in the subset of data blocks and in response to instructions to perform a copy of at least a subset of the plurality of data blocks to the secondary backup storage system, read the previously stored signature value corresponding to the data block from the at least one storage device for sending to the secondary storage system, and based on an indication as to whether the data block is already stored on the secondary storage system, read the data block from the at least one storage device for sending to the secondary backup storage system if the data block is not already stored on the secondary backup storage system, wherein the signature value and not the data block is read from the at least one storage device if the data block is already stored on the secondary backup storage system.

In certain embodiments, a method is disclosed for storing data at a backup storage system. The method includes for each of a plurality of data blocks involved in a backup storage operation, with one or more processors, associating a signature value corresponding to the data block with one or more of the data blocks and a reference to the data block to form a signature/data word corresponding to the data block, and logically organizing the signature/data words into a plurality of files each comprising at least one signature/data word such that the signature values are embedded in the respective file.

In certain embodiments, a system is disclosed for storing data at a backup storage system. The system includes at least one memory device. The system further includes a data packaging module executing in one or more processors. The data packaging module is configured to, for each of a plurality of data blocks involved in a backup storage operation, associate a signature value corresponding to the data block with one or more of the data blocks and a reference to the data block to form a signature/data word corresponding to the data block, and logically organize the signature/data words into a plurality of files each comprising at least one signature/data word such that the signature values are embedded in the respective file.

In certain embodiments, a method is disclosed for storing data at a storage system. The method includes, for each of a plurality of data blocks involved in a storage operation, with one or more processors, associating a signature value corresponding to the data block with one or more of the data blocks and a reference to the data block to form a signature/data word corresponding to the data block, and logically organizing the signature/data words into a plurality of files each comprising at least one signature/data word such that the signature values are embedded in the respective file.

BRIEF DESCRIPTION OF THE DRAWINGS

FIG. 4 illustrates a block diagram of another example storage system in accordance with embodiments described herein.

DETAILED DESCRIPTION

Figure 1:
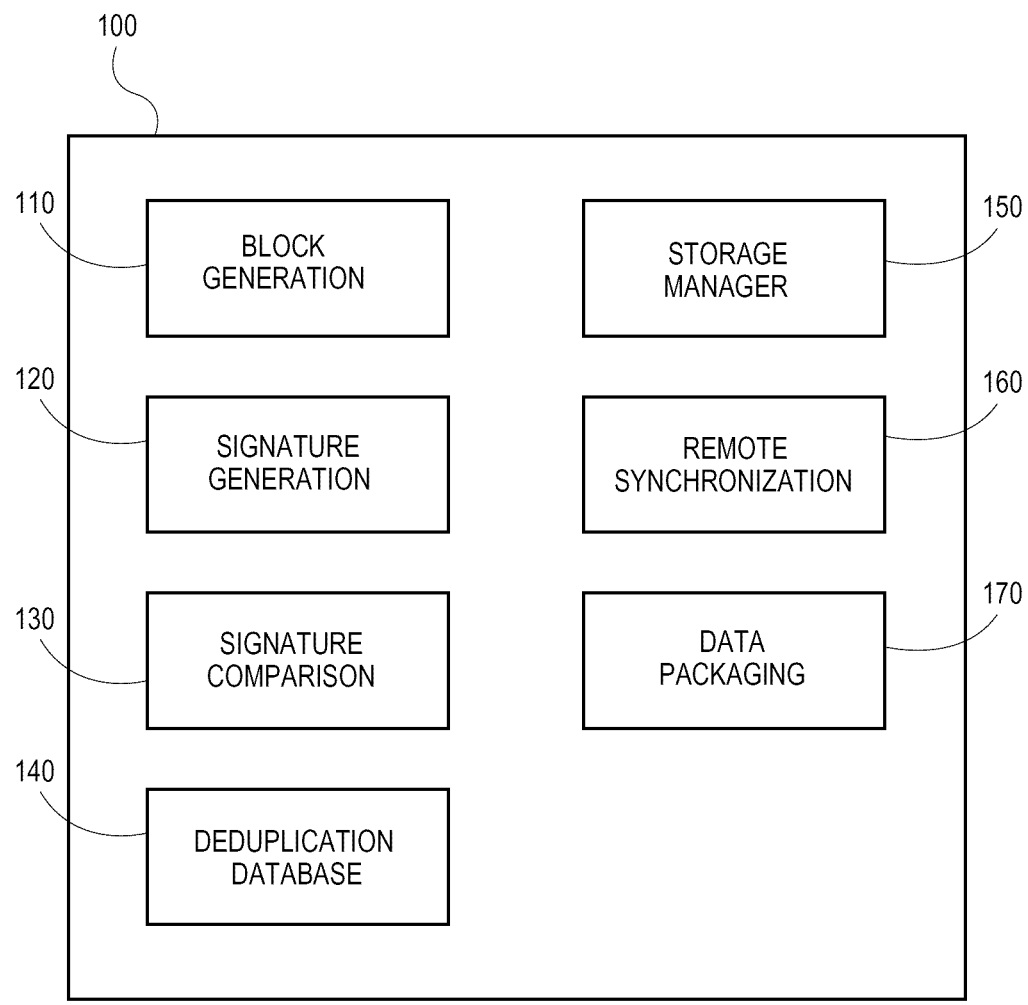
FIG. 1 is a block diagram that illustrates components of an example storage system configured to implement techniques compatible with embodiments described herein.

As will be seen from the disclosure herein, certain embodiments of systems and methods are provided for providing reduced overhead during operations involving deduplicated data. In particular, embodiments described herein store signature values along with their associated data blocks. Words including the signature values and data blocks (and/or data block references) can be stored generally at the time the data blocks are written, such as during a backup operation.

Thus, the signature values are generally embedded along with the data blocks and are readily accessible for later access, such as during an auxiliary copy. When a data block is requested for communication to a destination storage system from a source storage system, the signature value is initially read by the storage system and the data block itself is not. If the system determines that data block does not exist at the destination storage system using the signature, the data block itself is then read and communicated to the destination storage system. On the other hand, if the data block exists at the destination storage system, the data block is not communicated to the destination storage system, and is not read at the source storage system.

Thus, according to embodiments, when data blocks are already at the destination storage system, they are not read at the source, reducing the amount of data reads at the source storage system. While the signature value is read at the source storage system, the signature value is typically significantly smaller than the data block, so the amount of overhead associated with reading the signature is substantially lower than for the data blocks themselves. Moreover, according to certain embodiments, because the signature value is generally persistently stored along with the data, the signature value does not need to be regenerated when the data block is requested by the target system, substantially reducing computational overhead in the aggregate.

The performance improvement resulting from such techniques can be significant, particularly during storage operations involving the transfer of large amounts of data, such as during auxiliary copy operations from a primary backup storage system to a secondary backup storage system.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

In addition, methods and functions described herein are not limited to any particular sequence, and the acts or blocks relating thereto can be performed in other sequences that are appropriate. For example, described acts or blocks may be performed in an order other than that specifically disclosed, or multiple acts or blocks may be combined in a single act or block.

Additionally, while described primarily with respect to block-level deduplication techniques, certain embodiments described herein are compatible with file-level deduplication, or deduplication involving other levels of granularity.

System Overview

FIG. 1 is a block diagram that illustrates components of an example storage system 100 configured to implement deduplication techniques compatible with embodiments of the invention. The deduplication system 100 contains a block generation module 110, a signature generation module 120, a signature comparison module 130, a deduplication database (DDB) component 140, a storage manager module 150, a remote synchronization module 160, and a data packaging module 170.

The block generation module 110 generally operates on incoming data to break the data up into blocks which are then processed for deduplication. In various embodiments, the block generation module 110 can create blocks according to a number of policies. In some embodiments, for example, the blocks comprise fixed length segments of data. In other embodiments, blocks have variable lengths. According to certain embodiments, the block generation module 110 aligns the blocks intelligently based on the data content. Such techniques can increase the likelihood that generated blocks will contain duplicate data, thereby improving the amount of data reduction achieved via deduplication. Whether variable or fixed, a variety of block lengths are possible. For example, blocks can be 32 kilobytes (kB), 64 kB, 128 kB, 512 kB, or some other value.

The signature generation module 120 generates a substantially unique signature or identifier of a block. The signature, which is used to determine if another block is already stored at the relevant storage system location matches the block used to generate the signature. The signature comparison module 130 performs comparisons of the generated signatures of previously received and/or stored blocks to determine if they contain the same data (or, in some other embodiments, substantially similar data) as existing blocks. The results of the comparison indicate whether the previously received blocks are candidates for deduplication.

The signature generation module 120 may generate, and the signature comparison module 130 may thus compare, a variety of substantially unique signature types. In one embodiment, for example, the signature is a hash value. In other embodiments, the signature can be a message digest, checksum, digital fingerprint, digital signature or other sequence of bytes that substantially uniquely identifies the relevant data block. The term "substantially" is used to modify the term "unique identifier" because algorithms used to produce hash values may result in collisions, where two different files or data objects result in the same hash value. However, depending upon the algorithm or cryptographic hash function used, collisions should be suitably rare and thus the signature generated for block should be unique throughout the storage system 100.

The deduplication database 140 (DDB) is a data store that contains entries identifying data managed by the deduplication system 100, and may also contain supplemental information associated with files and/or blocks, such as signatures, paths, locations, reference counts, file sizes, or other information.

The storage operation manager module 150 coordinates storage operations and invokes the other modules of the storage system 100 as needed to perform requested storage operations. For example, the storage manager module 150 may include an application used by an administrator to manage the system 100. The storage operation manager module 150 may also maintain indexes of the data objects and each of the references to those data objects through the system 100, as well as pending operations on the data objects that are part of a data management plan of an organization implementing the single instancing system 100.

The storage system 100 can be a networked storage system configured to perform deduplication at one or more nodes in the system 100, and one or more of the components of the system 100 may be distributed across or instantiated at multiple nodes in the system.

Additionally, the system 100 can reduce the amount of data communicated across the network using deduplication techniques. For example, the synchronization module 160 performs deduplication between locations that are remote from one another, such as between a backup storage system and a secondary backup storage system, between a backup storage system and secondary backup storage, between a client system and a backup storage system, between an enterprise or organization having a headquarters or central office and one or more satellite or remote offices, and the like.

The synchronization module 160 can use the techniques described in further detail herein to determine whether a block should be communicated between the remote locations, or whether only a reference to the block should be communicated instead. As used in this context, the term "remote" can mean the modules are at different locations on the network, are physically or logically removed from one another, etc.

The data packaging module 170 can be generally configured to format data in the storage system 100 in an intelligent manner. For example, the data packaging module 170 according to certain embodiments generally associates and writes signature values along with the corresponding data blocks and/or block references. As is described in greater detail herein, associating and storing the signatures and/or references along with the data blocks can improve system performance.

As described in greater detail herein, redundant data may be detected and reduced at several locations throughout the system and/or times throughout the operation of the system. The embodiments provided herein only as examples, and are not intended to be an exhaustive list of the way in which the system can be implemented. In general, the systems and methods described with respect to any FIGS. 2-6B may include or be performed by the modules included in the system 100 of FIG. 1.

Figure 2:
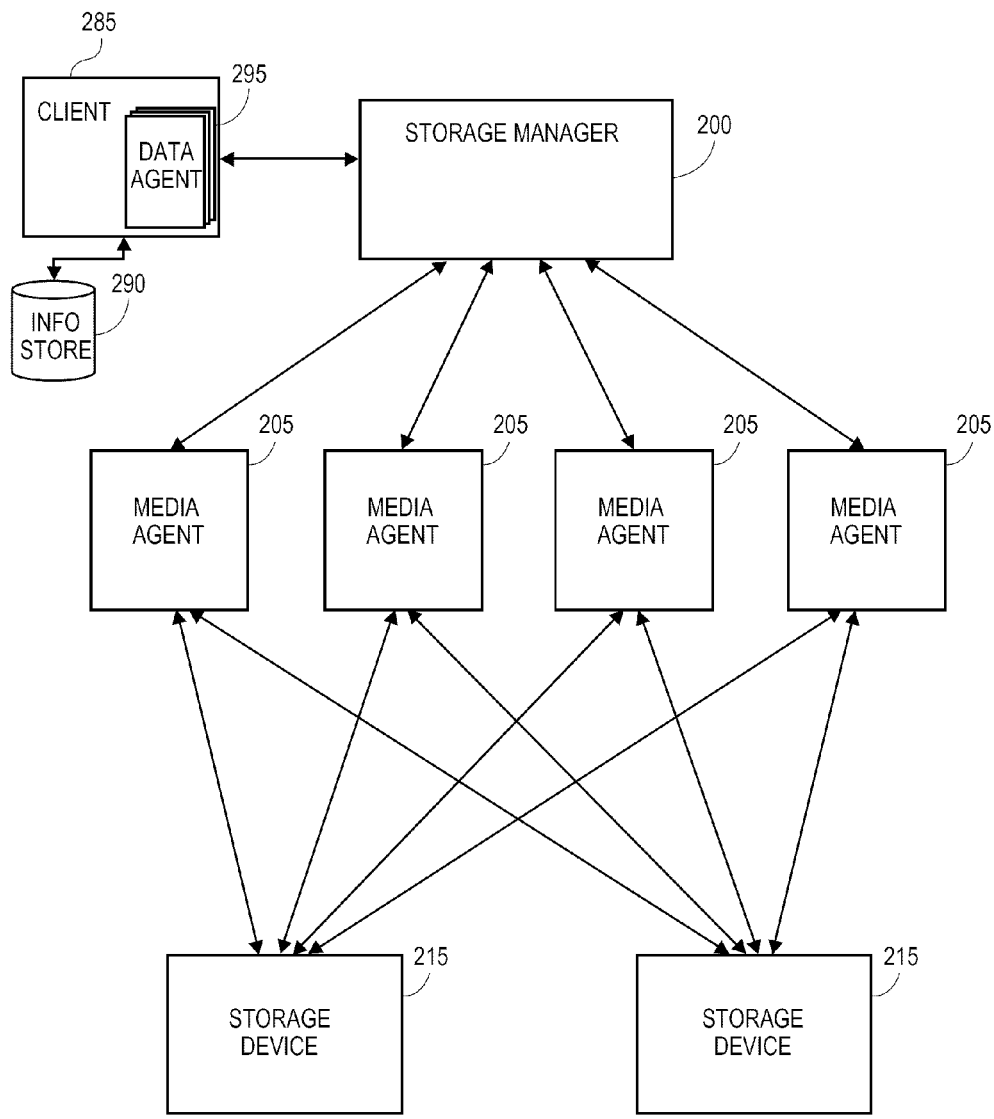
FIG. 2 illustrates a block diagram of an example network storage architecture compatible with embodiments described herein.

FIG. 2 illustrates a block diagram of an example network storage architecture compatible with embodiments described herein. For example, in certain embodiments, one or more of the components of the storage system 100 shown in FIG. 1 are implemented on a networked storage system such as the one shown in FIG. 2. The system 200 is configured to perform storage operations on electronic data in a computer network. As shown, the system includes a storage manager 200 and one or more of the following: a client 285, an information store 290, a data agent 295, a media agent 205, an index cache 210, and a storage device 215.

A data agent 295 can be a software module that is generally responsible for archiving, migrating, and recovering data of a client computer 285 stored in an information store 290 or other memory location. Each client computer 285 has at least one data agent 295 and the system can support many client computers 285. The system provides a plurality of data agents 295 each of which is intended to backup, migrate, and recover data associated with a different application. For example, different individual data agents 295 may be designed to handle Microsoft Exchange™ data, Microsoft Windows file system data, and other types of data known in the art. If a client computer 285 has two or more types of data, one data agent 295 may be implemented for each data type to archive, migrate, and restore the client computer 285 data.

The storage manger 200 is generally a software module or application that coordinates and controls the system. The storage manager 200 communicates with all elements of the system including client computers 285, data agents 295, media agents 205, and storage devices 215, to initiate and manage system backups, migrations, recoveries, and the like.

A media agent 205 is generally a software module that conducts data, as directed by the storage manager 200, between locations in the system. For example, the media agent may conduct data between the client computer 285 and one or more storage devices 215, between two or more storage devices 215, etc. The storage devices 215 can include a tape library, a magnetic media storage device, an optical media storage device, or other storage device. Although not shown in FIG. 2, one or more of the media agents 205 may also be communicatively coupled to one another.

Each of the media agents 205 can be communicatively coupled with and control at least one of the storage devices 215. The media agent 205 generally communicates with the storage device 215 via a local bus. In some embodiments, the storage device 215 is communicatively coupled to the media agent(s) 205 via a Storage Area Network ("SAN").

Further embodiments of systems such as the one shown in FIG. 2 are described in application Ser. No. 10/818,749, now U.S. Pat. No. 7,246,207, issued Jul. 17, 2007, which is incorporated by reference herein. In various embodiments, components of the system may be distributed amongst multiple computers, or one or more of the components may reside and execute on the same computer.

Furthermore, components of the system of FIG. 2 can also communicate with each other via a computer network. For example, the network may comprise a public network such as the Internet, virtual private network (VPN), token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, combinations of the same or the like.

Additionally, the various components of FIG. 2 may be configured for deduplication. For example, one or more of the clients 285 can include a deduplicated database (DDB). The data stored in the storage devices 215 may also be deduplicated. For example, one or more of the media agents 205 associated with the respective storage devices 215 can manage the deduplication of data in the storage devices 215.

Example System

Figure 3A:
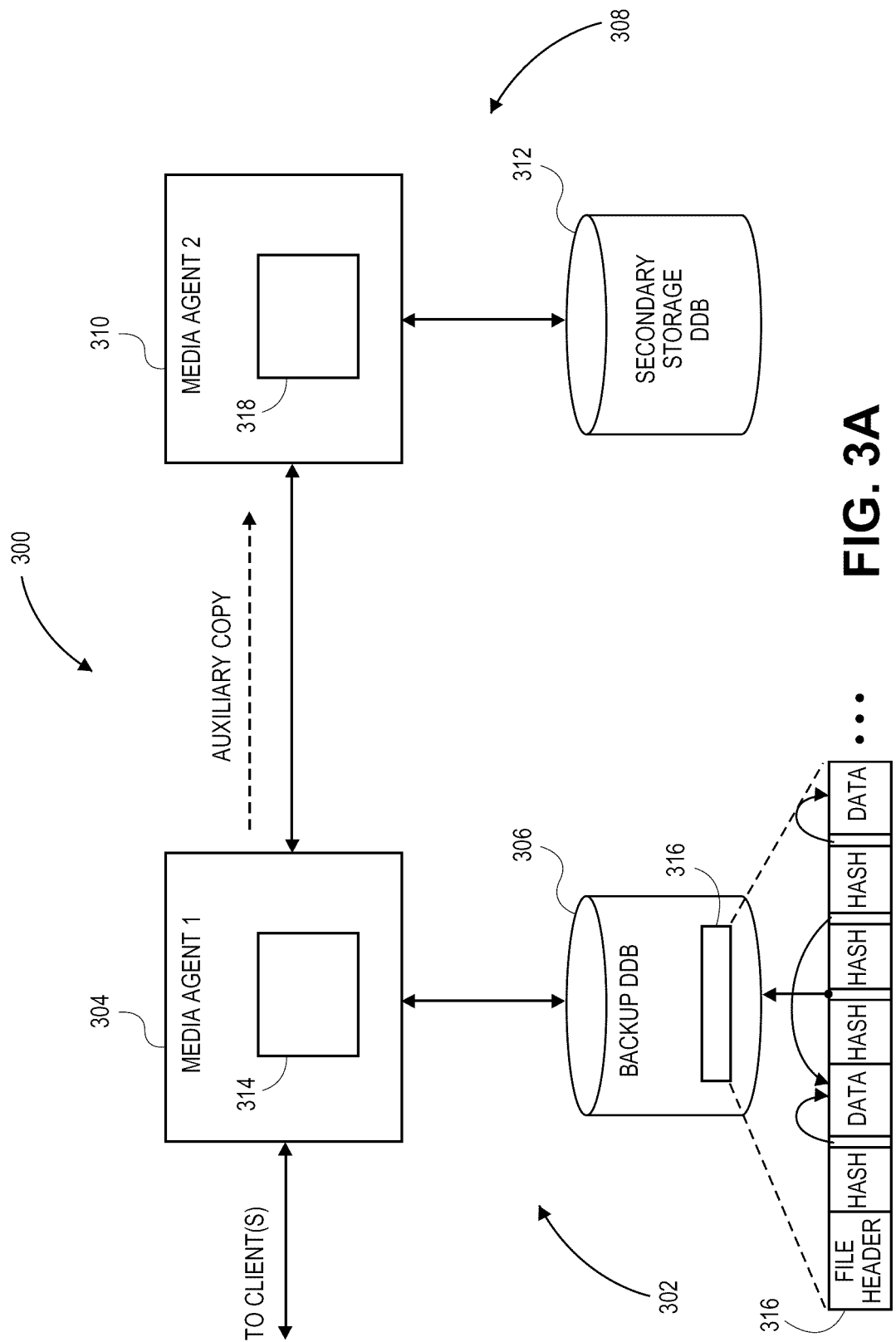
FIG. 3A illustrates a block diagram of an example storage system configured to perform backup and auxiliary copy operation in accordance with embodiments described herein.

FIG. 3A illustrates a block diagram of a storage system 300 in accordance with embodiments described herein. The system 300 includes a backup storage subsystem 302 including at least one first media agent 304 and at least one backup database 306. Because the backup database 306 can contain deduplicated data, it is also referred to as a backup deduplicated database, or backup deduplication database (backup DDB). The system 300 further includes a secondary backup storage subsystem 308 including at least one second media agent 310 and at least one secondary storage database 312. Again, because the secondary backup database 312 can contain deduplicated data, it is also referred as a secondary storage deduplicated database, or secondary storage deduplication database (secondary storage DDB).

The system 300 is advantageously configured to provide improved performance during data operations. The first media agent 304 is in communication with one or more client systems (not shown). For example, the first media agent 304 generally receives data from the client systems for backup operations, and can also be configured to send certain backed up data to the client systems, such as during a restore operation.

The first media agent 304 generally conducts the data to and from the backup DDB 306 for storage and retrieval (e.g., during backup and restore operations, respectively). In one example scenario, the first media agent 304 receives a data block (or group of data blocks) from the client system for backup. The first media agent 304 determines whether the data block already exists at the backup DDB 306. For example, the first media agent 304 can generate a signature (e.g., a hash value) corresponding to the data block and compare the signature to values in a signature table 314. The signature table 314 generally stores signatures corresponding to one or more of the data blocks already stored in the backup DDB 306.

In other embodiments, the first media agent 304 does not generate the hash itself, but instead receives the hash from the client system. If there is a match, the media agent 304 stores the data block in the DDB 306. Otherwise, the media agent 304 may store only a reference to the data block. The hash table 314 may reside at the media agent 304 as shown, at the backup DDB 306, or at some other location. In some embodiments, no hash table 314 is maintained.

Figure 3B:
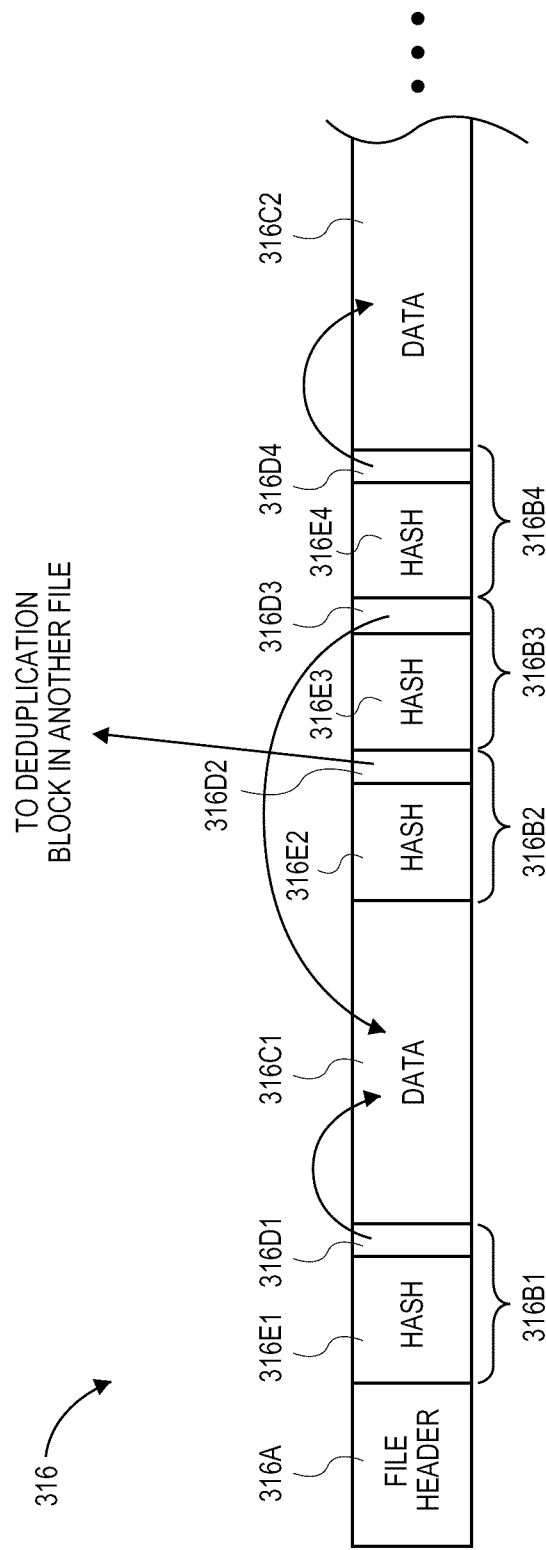
FIG. 3B illustrates a logical diagram of an example file stored in the storage system of FIG. 3A and organized in accordance with embodiments described herein.

According to certain aspects, when writing the data to the backup DDB 306, the first media agent 304 formats or packages the data such that performance of subsequent storage operations is enhanced. FIG. 3B shows a detailed view of the example packaged data file 316 stored on the backup DDB 306. The file 316 includes a file header 316a, one or more block headers 316b, and one or more data blocks 316c. Generally, the data packaging operations described herein such as the data packaging operations described with respect to any of FIGS. 3-6 may be performed by a data packaging module executing on one or more of the components in the system. For example, a data packaging module may be implemented on the storage manager, media agents (e.g., one or more of the media agents 304, 310 shown in FIG. 3A), or a combination thereof.

The file header 316a generally includes information related to the file such as a file name or identifier, information related to the application that created the file, user access information, or other metadata related to the file.

The block headers 316b can each include a block reference 316d (e.g., a pointer or link) and substantially unique signature 316e (e.g., a hash) corresponding to an associated data block. While not shown to scale, the signatures 316e and/or block references 316b according to certain embodiments are significantly smaller than the corresponding data blocks. For example, in one embodiment, the data blocks are 512 kB, and the signatures are 64 bytes, although other values can be used, such as 128, 256 or 512 bytes, or lesser or greater values. In other embodiments, the files 316 can include data blocks and/or signatures having variable lengths.

The ratio between the size of the data blocks and the size of the signature value is selected to calibrate system performance in certain embodiments. For example, in the above-described embodiment where the data blocks are 512 kB and the signature values are 64 bytes, the ratio is configured to be 8192. In another embodiment, the size of the data blocks is variable (e.g., selectable by a user) and ranges from between 32 kB and 512 kB, while the signature values are 64 bytes. In such an embodiment, the ratio is at least about 512. In various configurations, the ratio can be configured to be at least about 128, 256, 512, 1024, 2048, 4096, 8192, 16,384, 32,768, 65,536, at least about some other lesser or greater power of two, or at least about some other value.

Where a data block has not been deduplicated, the associated block reference 316d can point to the corresponding data block 316c itself in the file 316. For example, in the example file 316 the data blocks 316c1 and 316c2 have not been deduplicated. Thus, the block reference 316d1 points to the data block 316c1 stored in the file 316 and the block reference 316d4 points to the data block 316c2 in the file 316. However, where a data block in the file has been deduplicated, the block reference 316b points to a previously existing copy of the data block, and the data block itself may not be stored in the file 316. For example, the block reference 316d2 points to a previously existing data block at some other location in the backup DDB 306, such as a data block in another file. Where redundant data blocks exist within the same file, a block reference 316d can point to a previously existing copy of the data block within that same file. For example, the block reference 316d3 points to the data block 316c1 in the file 316.

As shown, the media agent 304 can package the data such that the signatures 316e are embedded in the file 316 and associated with the corresponding block references 316d and/or data blocks 316c. For example, the signatures 316e in one embodiment are stored in generally logically or physically contiguous memory space with the corresponding block reference 316d and/or data block 316c, or are otherwise logically associated. The groupings defined by the media agent 304 and including the respective signature values 316e, data block references 316d and/or data blocks 316c are referred to herein as signature/data words. Example data packaging processes are described in further detail herein, with respect to FIGS. 5A and 6A, for instance. In certain embodiments, link information can be added that includes information regarding the physical location of the actual data block. For example, the link information can include identifiers indicating the machine and/or path at which the data block is stored, an offset associated with the block, such as an offset indicating a position of the data block in the relevant file, and the like. In some embodiments, link information is added for each signature 316e. For example, the link information can be included in the block reference 316d in some embodiments, or in some other data structure.

Embedding the signature values in the signature/data words along with the data and/or data block references 316d is generally in contrast to where the signatures 316e are stored in a separate hash table, such as the hash table 314. For example, the hash table 314 may be used by the media agent 304 during backup for deduplication purposes, to determine whether incoming blocks are redundant. On the other hand, the signatures 316e embedded in the file 316 may be used for other specialized purposes, such as during copy or other operations, to quickly access the signature values as the operation is performed. Thus, in at least some embodiments, such as where the system 300 includes both a signature table 314 and signature values 316e embedded along with the data blocks 316c and/or block references 316b, the media agent 304 may maintain multiple instances of at least some signature values.

In some other alternative embodiments, the signatures 316e are stored in a separate hash table rather than being embedded along with the data blocks 316c and/or block references 316b. In such embodiments, the separate hash table may be in addition to the hash table 314, and the backup subsystem may therefore include at least first and second hash tables.

Example Auxiliary Copy Operation

Still referring to FIG. 3, in certain embodiments, the system 300 performs an auxiliary copy of data from the backup DDB 306 to the secondary storage DDB 312. Moreover, the system 300 can utilize certain advantageous aspects described herein to reduce the overhead and time associated with executing the auxiliary copy, improving system performance. Generally, the data transfer operations described herein such as the auxiliary copy operations described with respect to any of FIGS. 3-6 may be performed by a copy management module executing on one or more of the components in the system. For example, a copy management module may be implemented on the storage manager, media agents (e.g., one or more of the media agents 304, 310 shown in FIG. 3A), or a combination thereof.

In an example scenario, the first media agent 304 receives instructions to perform an auxiliary copy. The auxiliary copy may be scheduled (e.g., daily, weekly, etc.), and may be initiated by a storage manager (not shown). In other embodiments, the media agent 304 may initiate the auxiliary copy itself. Upon receiving the instructions, the first media agent 304 begins the copy operation.

In order to reduce the amount of data being sent to the second media agent 310 during the copy, the first media agent 304 sends signatures of corresponding data blocks to be copied to the second media agent 310 before sending the data blocks themselves. The second media agent 310 can check to see if the received signatures match the signatures of data blocks already existing at the secondary storage DDB 312. For example, the second media agent 310 compares the received signatures to entries in a signature table 318 (e.g., a hash table). If a data block already exists at the secondary storage DDB 312, the second media agent 310 stores a reference to the existing copy of the data block in the secondary storage DDB 312, and the first media agent 304 does not need to send the actual data block. If a data block does not exist at the secondary storage DDB 312, the second media agent 310 informs the first media agent 304, and the first media agent 304 will send the actual data block.

As discussed, the first media agent 304 writes the signature values 316e along with the data during the initial backup storage operation. For example, the signature values 316e are embedded with the data in the signature/data words. Thus, when the auxiliary copy request occurs at a later point in time, the signature values 316e are advantageously readily accessible by the first media agent 304 without having to read the data or generate the signature value at that point. As such, the first media agent 304 can efficiently retrieve the signature values 316e and send them to the second media agent 310. To access the signature values 316e, a lookup may be performed on the second media agent 310 to see if the hash already exists. If the hash already exists, the data block is not read or sent to the second media agent 310 as discussed in further detail herein.

For example, because the signature values 316e are generally significantly smaller than the data (e.g., 64B versus 512 kB), reading the signature values from the backup DDB 306 can consume less resources and/or take less time than reading the data blocks themselves to generate the signature values.

Additionally, because the signature values are embedded in the file 316 and associated with the corresponding block references 316b and/or data blocks 316c1, the signature values are readily accessible during the auxiliary copy operation. For example, during the copy operation, the media agent 304 can generally traverse the signature/data words in the file 316 and extract the signature values 316e. Example processes for reading the signature values 316e and/or data blocks 316c are described in further detail herein, with respect to FIGS. 5B and 6B, for instance.

It should be noted that a trade off exists between the improved performance achieved by techniques described herein and a corresponding reduction in storage utilization. This is because storing signature values 316e along with the corresponding block references 316b and/or data blocks 316c consumes additional storage.

Thus, depending on what resources are available, according to certain embodiments, system parameters can be tuned to achieve an appropriate balance between additional storage overhead and improved performance. Such parameters can include the size of the signatures 316e, the size of the data blocks 316c, the ratio between the signature size and block size, and the like. Additionally, the system 300 can allow manually tuning of these parameters by system operators and/or perform automatic tuning. For example, the system 300 in one embodiment performs parameter tuning based on the amount of available storage, the processing or memory capacity of the media agent 304, or the like. In other embodiments, the system 300 allows for manually or automatically disabling the storage of the signature values 316e along with the block references 316b and/or data blocks 316c.

Other Example Implementations and Contexts

Embodiments have been described in the context of improving auxiliary copy performance between a backup storage system and a secondary storage system. While certain embodiments may be particularly well suited for such application, the concepts described herein are not limited to auxiliary copy operations. Rather, it will be appreciated that the concepts described herein may be used in a variety of other contexts involving deduplicated data, such as during primary backup operations, restore operations, data replication, and the like. FIG. 4 shows one such context, where a storage system 400 includes a primary subsystem 401 including a client system 402 in communication with a primary data base 404, which may comprise a deduplicated data base (DDB). The system 400 also includes a backup subsystem 403 including a media agent 406 in communication with a backup deduplication database 408, which may also comprise a deduplicated database (DDB).

In one embodiment, the client organizes data stored on the primary DDB 404 in a manner similar to how the first media agent 304 organizes the data on the backup DDB 306 shown in FIGS. 3A-3B. Thus, files stored on the primary DDB 404 includes signature values embedded with corresponding data blocks and/or references to corresponding data blocks in the manner described with respect to FIGS. 3A-3B.

As such, it will be appreciated that the system 300 can provide improved performance for operations between the primary subsystem 401 and the backup subsystem 403. One such operation can include a backup operation in which data from the primary DDB 404 is sent to the backup subsystem 403 for storage in the backup DDB 408.

Example Processes

Figure 5A:
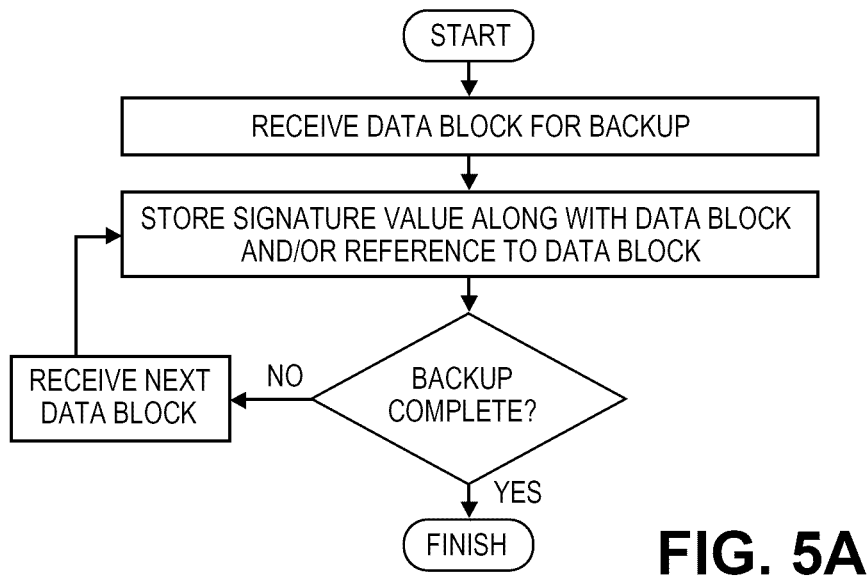
FIG. 5A-B illustrate flow charts of example backup and auxiliary copy operations, respectively, in accordance with embodiments described herein.
Figure 5B:
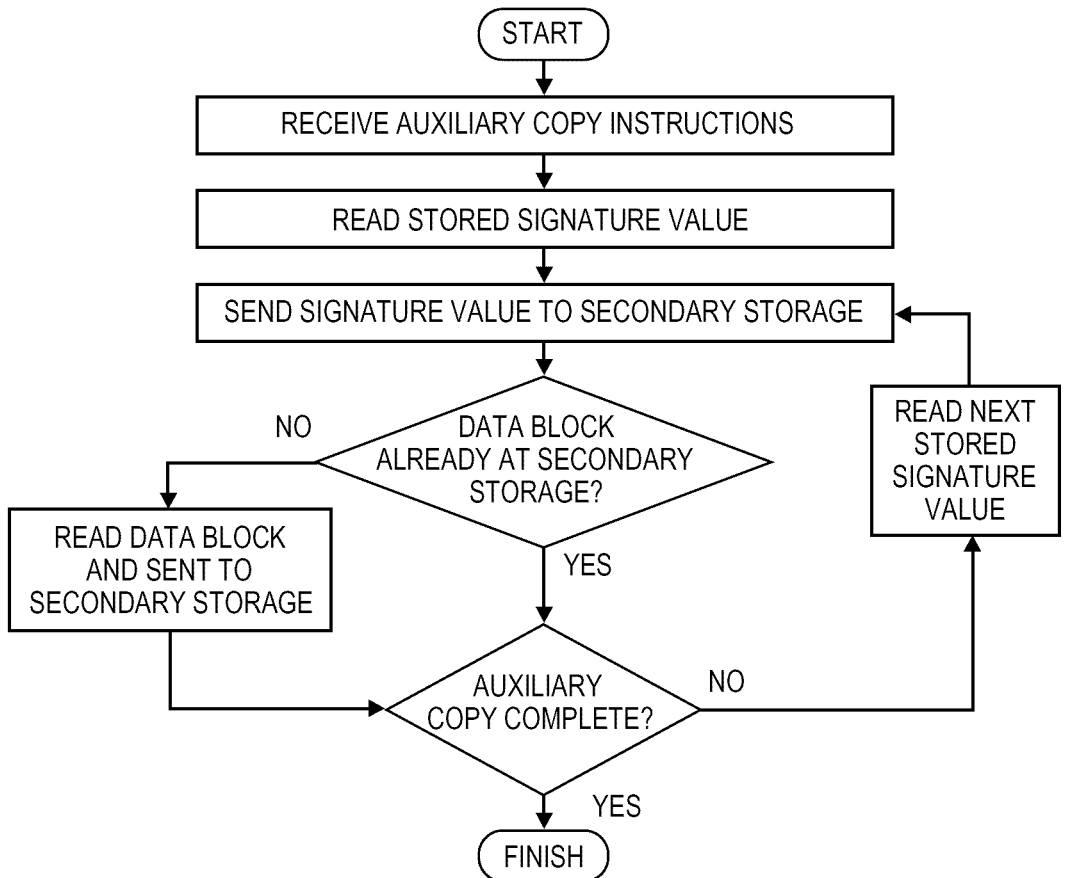

FIG. 5A-B illustrate flow charts of example backup and auxiliary copy operations, respectively, usable by the storage system of FIG. 3 in accordance with embodiments described herein. Referring to FIG. 5A, the process 500 begins when a backup operation is initiated (e.g., by a storage manager or other component). At block 502, the process 500 receives a data block or group of data blocks for backup. For instance, the data block or group of data blocks may be received by the first media agent 304 from one or more client systems.

At block 504, the process 500 stores a signature value corresponding to the data block along with the data block and/or a reference to the data block. For example, the media agent 304 may compute a hash or other signature value based on the data block, or may instead receive the hash from the client system. In certain embodiments, the process 500 stores the reference (e.g., pointer or link) to the data block instead of the data block itself when the data block already exists in the backup DDB 306. The media agent 304 may consult a hash table 314 or other appropriate data structure to make the determination, for example. In some embodiments, the media agent 305 initially only receives a signature value corresponding to a data block from the client system, and not the data block itself. In such cases, the client system generally only sends the data block after the media agent 304 determines that the data block is not already stored in the backup DDB 306 and sends a corresponding indication to the client system.

At block 506, the process 500 determines if the backup operation is complete. For example, the client system or storage manager may indicate to the media agent that the backup operation is complete. If the backup operation is not complete, the media agent 304 receives the next data block or group of data blocks for backup from the client system at block 508 and continues the backup process. If the process 508 determines that the backup operation is complete, the process terminates.

Referring to FIG. 5B, the process 550 at block 552 receives instructions to perform an auxiliary copy operation. For example, the media agent may receive the instructions from a storage manager component, from the client system, the second media agent 310, or some other entity. In some embodiments, a human operator manually instructs the system 300 to perform an auxiliary copy. In yet another configuration, the instructions can be received from the first media agent 304 itself, such as where an internal scheduler residing on the first media agent 304 instructs it to perform an auxiliary copy (e.g., at predetermined intervals).

At block 554, the process 550 reads the stored signature value corresponding to the first data block (or group of data blocks). Because the signature value was embedded along with the corresponding data block and/or reference to the data block, as described above with respect to the backup process 500, the signature value is readily available to the process 550. Thus, the process 550 does not have to read the data block from the backup DDB 306 in order to generate the signature value, reducing operational overhead.

Then, at block 556, the process 550 sends the signature value (or group of signature values) to the secondary storage subsystem 308. For example, the process 550 sends the signature value to the second media agent 310.

The process 550 receives an indication as to whether the data block corresponding to the sent signature value is already stored at the secondary storage DDB 312 at block 558. For example, the second media agent 310 may receive the signature value from the first media agent 304 and consult the signature table 318 to determine whether the data block is already stored at the secondary storage DDB 312. The second media agent 310 may then send the first media agent 304 the indication based on this determination. As will be appreciated, a variety of other mechanisms are possible for this handshaking operation between the first and second media agents 304, 310.

If the data block (or group of data blocks) is not already stored at the secondary storage DDB 312, at block 560 the process 550 reads the data block itself from the backup DDB 306 and sends the data block to the second media agent 310 for storage in the secondary storage DDB 312. After sending the data block, the process 550 determines whether the auxiliary copy operation is complete at block 562. For example, the media agent 304 may detect that each data block on the backup DDB 306, or at least each data block scheduled for copy, has been copied to the secondary storage DDB 312. If the data block is already stored at the secondary storage DDB 312, the process does not read the data block, and instead moves generally directly to block 562.

If the auxiliary copy operation is complete, the process 550 finishes. On the other hand, if the auxiliary copy operation is not complete, the process 550 reads the next stored signature value (or group of signature values) and continues the copy operation to completion. While described in terms of an auxiliary copy operation from a backup storage system to a secondary backup storage system, the techniques and advantages described with respect to the processes 500, 550 of FIGS. 5A-5B may be achieved in a variety of other contexts, such as in a primary backup operation from one or more client systems to a backup system, or the like.

Figure 6A:
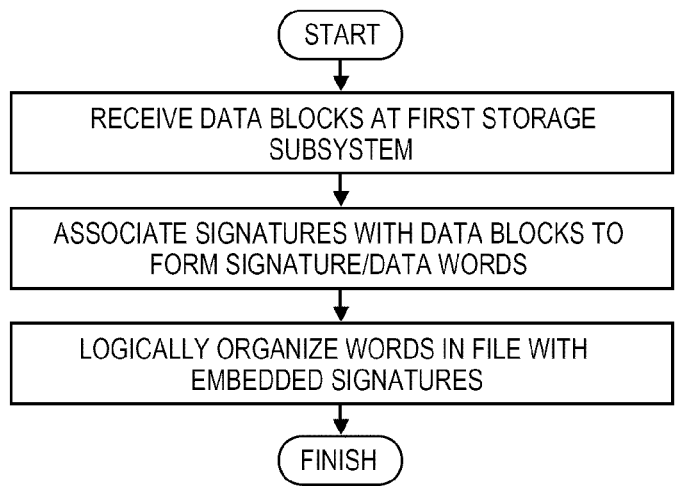
FIG. 6A illustrates a flow chart of an example data packaging operation in accordance with embodiments described herein.

FIG. 6A illustrates a flow chart of an example data packaging process 600 in accordance with embodiments described herein. Generally, the data packaging process 600 can be usable by any of the storage systems described herein. For example, the data packaging operation may be usable by the system 300 of FIG. 3 to create the example file 316 described above and shown in FIGS. 3A-3B. The processes 600, 650 shown in FIGS. 6A-B will be described with respect to the file 316 of FIG. 3 for the purposes of illustration, although other file structures may be compatible.

At block 602, the process 600 receives a plurality of data blocks for storage in a first storage subsystem. As will be appreciated, the first storage subsystem may comprise a variety of entities in a storage system, such as any of a backup system, secondary storage system, client system, or the like in a networked storage system. The data blocks may be received serially, in groups, or in some other manner, depending on the system's data communication protocol.

At block 604, the process 600 associates signature values 316e with corresponding data blocks 316c and/or references 316b to the corresponding data blocks to form signature/data words. The association may be in the form of a logical association, physical association, or both. For example, the signature values 316e, corresponding data blocks 316c, and/or references 316b to the corresponding data blocks may be arranged in logically or physically contiguous memory space. As an example, referring to FIG. 3B, each hash 316e, block reference 316b/data block 316c grouping in the file 316 generally constitutes a signature/data word. It will be appreciated that the associations may occur generally serially or incrementally as data block or groups of data blocks are received.

At block 606, the process 600 logically organizes the signature/data words in a file 316 such that the signature values are embedded in the file. As such, the signature values are readily accessible by the system 300. For example, by traversing the file 316, the process 600 can readily determine which hash value 316e corresponds to the current data block 316c in the file. Thus, the hash values 316e can be accessed efficiently without having to regenerate the value or read the data block.

Figure 6B:
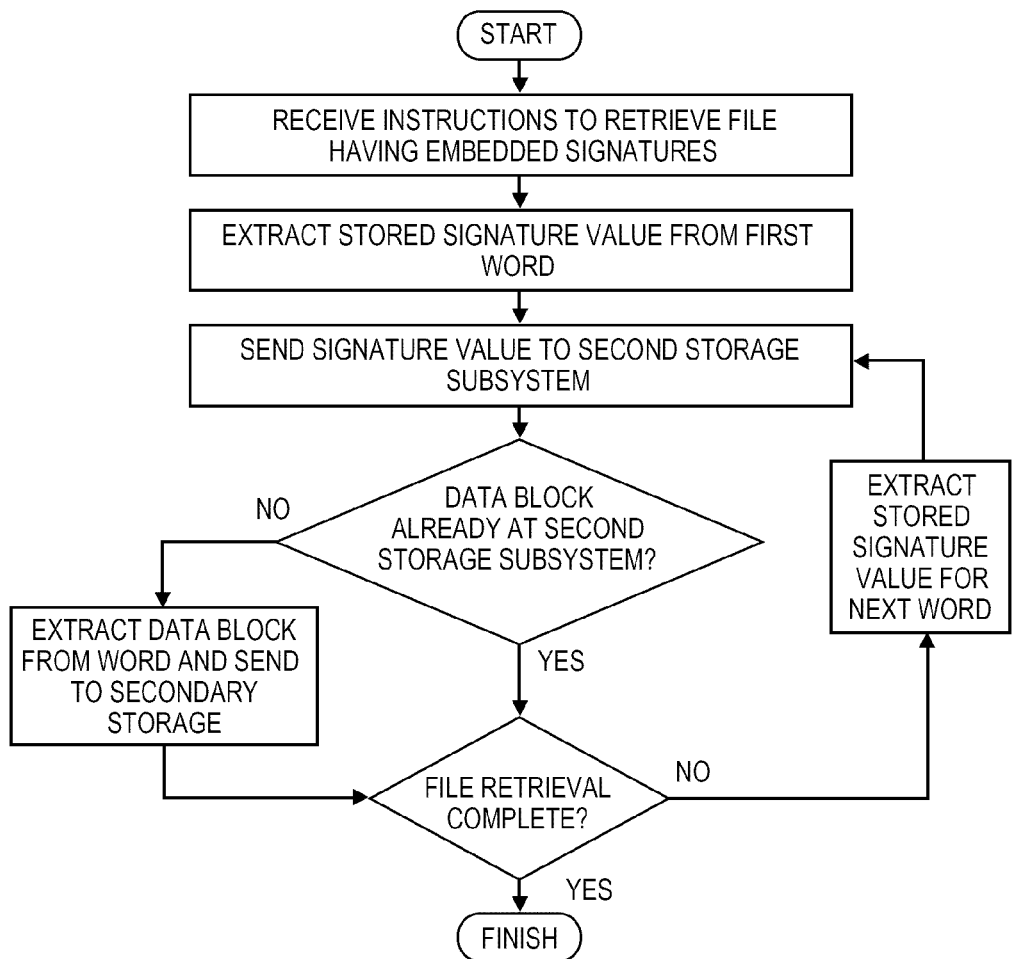
FIG. 6B illustrates a flow chart of an example process of retrieving a file stored according to the process of FIG. 6A in accordance with embodiments described herein.

FIG. 6B illustrates a flow chart of an example process 650 of retrieving a file stored according to the process of FIG. 6 in accordance with embodiments described herein. The process 650 receives instructions at block 652 to retrieve a file 316 or portion thereof stored at a first storage subsystem having embedded signature values 316e and stored at a first storage subsystem, according to certain embodiments.

The instructions can be received from a source external to the first storage subsystem, or can be internally generated (e.g., by a scheduler or the like). While the process 650 is described in the context of a file retrieval, the data retrieval may be for other granularities of data, such as a subset of data blocks or a single data block 316c. In one embodiment, the first storage subsystem is instructed to retrieve subsets of data blocks 316c or individual data blocks 316c from multiple different files.

The file retrieval instructions generally comprise any request to access the file 316. Such accesses may be for the purposes of sending data to another location in a networked storage system, such as for backup, replication, auxiliary copy, or for some other purpose.

At block 654, the process 650 extracts the stored signature value 616e from the first requested word, such as the first word in the file 316. For example, in response to a request to retrieve the file 316 shown in FIGS. 3A-3B, the process 300 extracts the first hash value 316e1 associated with the first data block 316c1. The process 650 can extract the signature value 316e in a variety of ways. For example, the process 650 may traverse the each signature/data word in the file 316 sequentially, identifying and reading the signature values 316e during the traversal.

Once the signature value 316e is extracted, the process 650 sends the signature value to a second storage subsystem in the storage system (e.g., secondary storage system, backup storage system, etc.) at block 656. At block 658, the process 650 determines whether or not the data block already exists at the second storage subsystem. Although a variety of handshaking mechanisms may be used, in one embodiment, the second storage subsystem consults a signature table using the received signature and sends an indication to the first storage subsystem whether or not the data block already exists at the second storage subsystem.

If the block does not exist at the second storage subsystem, the process 650 at block 658 extracts the data block 316c from the current signature/data word and sends it to the secondary storage subsystem. The extraction of the data block 316c may be generally similar to that of the signature value 316e described above. Once the data block has been sent, the process 650 determines whether or not the file retrieval is complete at block 660. For example, the process 650 may detect that it has traversed the entire file 316 or group of files, or may receive an indication from some external source that the retrieval process is complete.

If, at block 658 the process 650 determined that the data block already existed at the second storage system, the process 650 moves directly to block 660 without extracting or sending the data block itself. In such cases, the process 650 advantageously does not read the data block at all during the retrieval process. If the file retrieval process is complete, the process 650 terminates. If not, the process 650 extracts the stored signature value 316e for the next signature/data word, and continues the retrieval process accordingly. For example, the process 650 may traverse to the next signature/data word in the file 316 and extract and send the signature value 316e2 corresponding to the deduplicated data block referenced by the block reference 316b2.

Terminology/Additional Embodiments

In certain embodiments of the invention, operations disclosed herein can be used to copy or otherwise retrieve data of one or more applications residing on and/or being executed by a computing device. For instance, the applications may comprise software applications that interact with a user to process data and may include, for example, database applications (e.g., SQL applications), word processors, spreadsheets, financial applications, management applications, e-commerce applications, browsers, combinations of the same or the like. For example, in certain embodiments, the applications may comprise one or more of the following: MICROSOFT EXCHANGE, MICROSOFT SHAREPOINT, MICROSOFT SQL SERVER, ORACLE, MICROSOFT WORD and LOTUS NOTES.

Moreover, in certain embodiments of the invention, data backup systems and methods may be used in a modular storage management system, embodiments of which are described in more detail in U.S. Pat. No. 7,035,880, issued Apr. 5, 2006, and U.S. Pat. No. 6,542,972, issued Jan. 30, 2001, each of which is hereby incorporated herein by reference in its entirety. For example, the disclosed backup systems may be part of one or more storage operation cells that includes combinations of hardware and software components directed to performing storage operations on electronic data. Exemplary storage operation cells usable with embodiments of the invention include CommCells as embodied in the QNet storage management system and the QiNetix storage management system by CommVault Systems, Inc., and as further described in U.S. Pat. No. 7,454,569, issued Nov. 18, 2008, which is hereby incorporated herein by reference in its entirety.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Embodiments of the invention are also described above with reference to flow chart illustrations and/or block diagrams of methods, apparatus (systems) and computer program products. It will be understood that each block of the flow chart illustrations and/or block diagrams, and combinations of blocks in the flow chart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for performing an auxiliary copy operation, comprising:

for each data block of a plurality of data blocks involved in a backup storage operation, with one or more processors comprising computer hardware, associating a signature value corresponding to the data block with one or more of a copy of the data block and a reference to a copy of the data block to form a signature/data word corresponding to the data block, wherein at least some of the signature/data words include the signature value corresponding to the data block and a reference to a copy of the data block that is stored in another signature/data word, but do not include a copy of the data block;

logically organizing the signature/data words into a plurality of files, each file of the plurality of files comprising at least one signature/data word such that the signature values are embedded in the file;

storing the plurality of files comprising the embedded signatures in at least one first storage device;

with one or more processors comprising computer hardware, in response to an instruction to perform an auxiliary copy of at least one file of the plurality of files from the first storage device to at least one second storage device, and for each signature/data word in the at least one file:

reading the embedded signature value corresponding to the signature/data word from the first storage device;

transmitting the signature value;

subsequent to said transmitting the signature value, receiving an indication as to whether a copy of the data block corresponding to the signature value exists at the second storage device; and reading a copy of the data block corresponding to the signature value from the first storage device if a copy of the data block does not exist at the second storage device, wherein a copy of the data block is not read from the first storage device if a copy of the data block does exist at the second storage device.

2. The method of claim 1, wherein the associating comprises logically associating the signature value corresponding to the data block with one or more of a copy of the data block and a reference to a copy of the data block.

3. The method of claim 1, wherein the associating comprises storing the signature values corresponding to the data block in memory space that is logically contiguous with memory space that stores one or more of a copy of the data block and a reference to the copy of the data block.

4. The method of claim 1, wherein the reading the signature value further comprises traversing to the respective signature/data word in the file and extracting the signature value for reading without reading the data block in the respective signature/data word.

5. The method of claim 4, wherein the reading the data block further comprises:

traversing to the respective signature/data word in the file to access a reference to the data block in the signature/data word; and using the accessed reference to the data block, locating the data block on the first storage device.

6. The method of claim 1, wherein the signature/data words corresponding to deduplicated data blocks comprise the signature value corresponding to the respective data block and a reference to a copy of the respective data block, and not a copy of the respective data block itself.

7. A system for performing an auxiliary copy operation, comprising:

one or more processors comprising computer hardware; and a data packaging module executing in the one or more processors and configured to:

for each data block of a plurality of data blocks involved in a backup storage operation, associate a signature value corresponding to the data block with one or more of a copy of the data block and a reference to a copy of the data block to form a signature/data word corresponding to the data block; and logically organize the signature/data words into a plurality of files, each file of the plurality of files comprising at least one signature/data word such that the signature values are embedded in the file; and store the plurality of files comprising the embedded signatures in at least one first storage device; and an auxiliary copy management module executing in the one or more processors and configured to, in response to an instruction to perform an auxiliary copy of at least one file of the plurality of files from the first storage device to at least one second storage device, and for each signature/data word in the at least one file:

read the embedded signature value corresponding to the signature/data word from the first storage device;

transmit the signature value;

subsequent to transmitting the signature value, receive an indication as to whether a copy of the data block corresponding to the signature value exists at the second storage device; and read a copy of the data block corresponding to the signature value from the first storage device if a copy of the data block does not exist at the second storage device, wherein a copy of the data block is not read from the first storage device if a copy of the data block does exist at the second storage device.

8. The system of claim 7, wherein the data packaging module logically associates the signature value corresponding to the data block with one or more of a copy of the data block and a reference to a copy of the data block to form the signature/data word.

9. The system of claim 7, wherein the data packaging module stores the signature values corresponding to the data block in memory space that is logically contiguous with memory space that stores one or more of a stored copy of the data block and a reference to the copy of the data block.

10. The system of claim 7, wherein the auxiliary copy management module is configured to read the signature value by traversing to the respective signature/data word in the file and extracting the signature value for reading without reading the data block in the respective signature/data word.

11. The system of claim 7, wherein the auxiliary copy management module is configured to read the data block at least partly by:

traversing to the respective signature/data word in the file to access a reference to the data block in the signature/data word; and using the accessed reference to the data block, locating the data block on the first storage device.

12. The system of claim 7, wherein the signature/data words corresponding to deduplicated data blocks comprise the signature value corresponding to the respective data block and a reference to a copy of the respective data block, and not a copy of the respective data block itself.

* * * * *